(12) United States Patent
O'Brien

(10) Patent No.: US 10,843,143 B2
(45) Date of Patent: Nov. 24, 2020

(54) DISPENSING SYSTEM

(71) Applicant: Packaging Innovation Ltd., London (GB)

(72) Inventor: Michael Gerard O'Brien, London (GB)

(73) Assignee: PACKAGING INNOVATION LTD., London (GB)

( * ) Notice: Subject to any disclaimer, the term of this patent is extended or adjusted under 35 U.S.C. 154(b) by 0 days.

(21) Appl. No.: 16/173,792

(22) Filed: Oct. 29, 2018

(65) Prior Publication Data

US 2019/0126214 A1 May 2, 2019

(30) Foreign Application Priority Data

Nov. 2, 2017 (GB) .................................. 1718186.8
Nov. 16, 2017 (GB) .................................. 1718921.8

(51) Int. Cl.
*B67D 7/78* (2010.01)
*B01F 3/08* (2006.01)
(Continued)

(52) U.S. Cl.
CPC .............. *B01F 3/0865* (2013.01); *B65D 1/20* (2013.01); *B65D 1/323* (2013.01);
(Continued)

(58) Field of Classification Search
CPC ......... B01F 3/0865; B65D 1/20; B65D 1/323; B65D 51/1616; B65D 51/1622;
(Continued)

(56) References Cited

U.S. PATENT DOCUMENTS

| | | | |
|---|---|---|---|
| 6,321,798 B1 | 11/2001 | Solignac | |
| 2007/0098598 A1* | 5/2007 | Ahern | G01N 1/38 422/400 |
| 2008/0135587 A1 | 6/2008 | Monti | |

FOREIGN PATENT DOCUMENTS

| | | |
|---|---|---|
| CN | 202876671 U | 4/2013 |
| KR | 20130046656 A | 5/2013 |

OTHER PUBLICATIONS

Combined Search and Examination Report under Sections 17 and 18(3) for United Kingdom Patent Application No. GB1718921.8 dated May 15, 2018 (6 pages).

* cited by examiner

*Primary Examiner* — Paul R Durand
*Assistant Examiner* — Robert K Nichols, II
(74) *Attorney, Agent, or Firm* — Withrow & Terranova, P.L.L.C.

(57) ABSTRACT

The present invention provides a dispensing system comprising a self-gassing liquid to be dispensed and a dispenser for dispensing the self-gassing liquid, the dispenser including: a valve housing having an inlet for receiving the liquid and an outlet through which the liquid is to be dispensed; a valve chamber and/or passage extending between the inlet and the outlet, and a valve arranged to open and close the valve chamber and/or passage; pressure maintaining means arranged to maintain the pressure of liquid at the inlet to the valve housing at a constant pressure during successive dispensing operations; and control means for controlling the opening and closing of the valve, the control means being arranged to open and close the valve to commence and terminate each successive dispensing operation, wherein the period for which the valve is open determines the quantity of liquid dispensed. The dispensing system may permit very small quantities of liquid to be dispensed with great accuracy and avoid the liquid being subjected to high shear forces. The system is particularly beneficial for the dispensing of peracetic acid.

27 Claims, 7 Drawing Sheets

Figure 1:
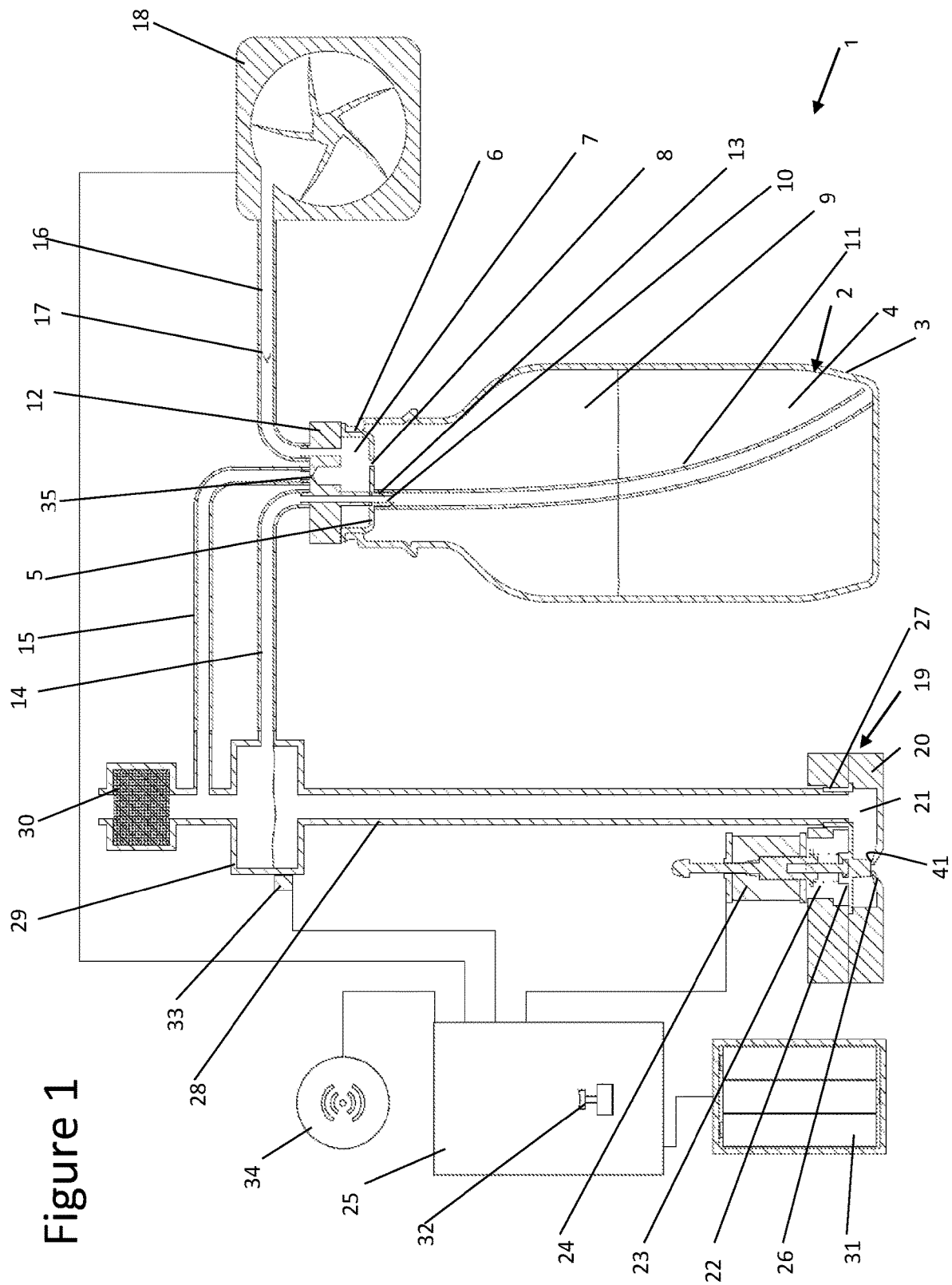

(51) Int. Cl.
    *G05D 11/13*     (2006.01)
    *B65D 51/16*     (2006.01)
    *F04B 49/04*     (2006.01)
    *F04F 1/06*     (2006.01)
    *B65D 1/32*     (2006.01)
    *F04B 41/02*     (2006.01)
    *F04F 1/14*     (2006.01)
    *B65D 1/20*     (2006.01)
    *B65D 77/04*     (2006.01)
    *B67D 1/08*     (2006.01)
    *B67D 7/02*     (2010.01)
    *F04B 13/02*     (2006.01)

(52) U.S. Cl.
    CPC ..... *B65D 51/1616* (2013.01); *B65D 51/1622* (2013.01); *B65D 77/0406* (2013.01); *B67D 1/0802* (2013.01); *B67D 7/0266* (2013.01); *B67D 7/78* (2013.01); *F04B 41/02* (2013.01); *F04B 49/04* (2013.01); *F04F 1/06* (2013.01); *F04F 1/14* (2013.01); *G05D 11/132* (2013.01); *B67D 7/0294* (2013.01); *F04B 13/02* (2013.01)

(58) Field of Classification Search
    CPC .............. B65D 77/0406; B65D 1/0802; B65D 7/0266; B65D 7/78; F04B 41/02; F04B 49/04; F04B 13/02; F04F 1/06; F04F 1/14; G05D 11/132; B67D 7/0294; B67D 2001/1259; B67D 2001/1263; B67D 2210/00157
    USPC ........................ 222/400.7, 389, 64, 56, 400.8
    See application file for complete search history.

DISPENSING SYSTEM

This application claims priority under 35 U.S.C. § 119 to United Kingdom Patent Application No. 1718186.8 filed on Nov. 2, 2017 and to United Kingdom Patent Application No. 1718921.8 filed on Nov. 16, 2017.

The present invention relates to a dispensing system which is capable of dispensing small and accurate volumes of a self-gassing liquid and particularly, but not exclusively, to a dispensing system which is suitable for dispensing a liquid, such as peracetic acid, that is not suitable for use with most commonly available pumps or meters and which, if subjected to shear forces during pumping or metering, exhibits increased gassing and may subsequently have a shorter active life.

Peracetic acid is a self-gassing liquid known for use as a non-residual biocidal activator in cleaning solutions, which solutions may typically find use for cleaning equipment in the food processing and brewing industries. An advantage of using such a biocidal activator based cleaning solution is that it may be used instead of current chemical concentrates, used for cleaning and sanitizing, which presently contain a potentially hazardous residual biocidal component.

With an activator based system a cleaning concentrate may be transported and stored in its inactive state as a biocidally inactive concentrate. An activator, such as peracetic acid, may then be added, either to the concentrate or a solution containing the concentrate, immediately prior to use. If the concentrate is diluted before the activator is added then the concentrate need never be active, or thus biocidal, in its undiluted full strength state.

A further advantage of an activator based system is that the dilute cleaning solution may again become inactive after a certain period of time. Thus any residual solution on surfaces may be active to perform its function, for example to kill bacteria, and then subsequently become inactive and thus safe. Also any remaining solution may be safely disposed of.

From the above it is seen there may be some major advantages to using an activator based cleaning system. However, with an activator based cleaning system, a dispensing system is required that ensures that an accurate volume, or dose, of activator is dispensed to ensure an effective biocidal strength. Also, with certain types of activator, such as peracetic acid, it can be important that the required dose is not exceeded and that the volume of activator is matched to the volume of solution containing the concentrate. This is because some activators, such as peracetic acid, may result in very unpleasant odors, which odors will not be confined to solutions in a receptacle containing excess unused activator, but will also result in odors being given off from the possibly large surface areas which have been cleaned and sanitized.

From the above it will be appreciated that it is important to have a dispensing system that can accurately dispense a quantity of an activator. However, this can be particularly problematic in the case of a liquid activator such as peracetic acid, for it is a very strong oxidizing agent. It is thus corrosive to most metals and causes rapid degradation of most commonly available plastic materials, thus making it unsuitable for use with most types of pumps and meters.

In addition to the above requirement, to be able to accurately dispense a predetermined volume of an activator, there is also a requirement for such an activator to be securely handled and for vapours given off by such an activator to be prevented from being discharged into the atmosphere.

Furthermore, the "self-gassing" nature of such activators can be problematic for reasons of safety and accurate dispensing. For example, peracetic acid is supplied as a solution in acetic acid, which solution is a dynamic equilibrium mixture of peracetic acid, hydrogen peroxide, acetic acid, and water. Many factors can change the dynamics of the solution resulting in the release of gas. These factors can be temperature, dirt (by the introduction of nucleation sites), shearing force (of for instance a pump), shock, surface finish and/or chemical nature of any contact surface, amongst others. The overall resultant release of gas is commonly referred to as "self-gassing". This release of gas by the liquid can create problems associated with accurate dispensing as well as safe handling and storage.

Possibly as a result of issues with handling and accurately measuring peracetic acid, its use as an activator with cleaning chemicals has been mainly confined to large scale applications, such as in the food processing and brewing industries, where it is used mainly in controlled, non-public, environments. Here its use can be carefully supervised, with the occasional release of odors in a well ventilated area possibly being acceptable. Furthermore, the large volumes dispensed in such applications makes it easier to accurately control the proportions dispensed.

Thus peracetic acid has not, up to now, been commonly used in more general applications, for example for adding to chemicals in trigger bottles or the like, to activate solutions used in general cleaning and sterilising applications, such as in restaurants, kitchens and hospitals.

It is an object of the present invention to provide a dispensing system which can accurately measure small quantities of self-gassing liquids and particularly to provide a system which may be suitable for the dispensing of small accurate quantities of an activator such as peracetic acid.

According to the present invention there is provided a dispensing system comprising a self-gassing liquid to be dispensed and a dispenser for dispensing said self-gassing liquid, the dispenser comprising:

a valve housing having: an inlet for receiving the liquid and an outlet through which the liquid is to be dispensed; a valve chamber and/or passage extending between the inlet and the outlet and a valve arranged to open and close the valve chamber and/or passage;

pressure maintaining means arranged to maintain the pressure of liquid at the inlet to the valve housing at a constant pressure during successive dispensing operations; and control means for controlling the opening and closing of the valve, the control means being arranged to open and close the valve to commence and terminate each successive dispensing operation, the control means is arranged to open the valve for a predetermined period of time, which period of time is determined by the desired quantity of liquid to be dispensed. The solenoid valve may also be configured to dispense in a series of fixed lower volume doses such that the final dose is made up of multiples of the individual lower volume doses.

A self-gassing liquid is to be interpreted for the purposes of the present specification, including the claims, as a liquid that is likely to give off a gas when subjected to shear forces and/or when encountering nucleation sites.

A dispensing system in accordance with the present invention may permit small quantities of a liquid to be dispensed with a high level of accuracy, by using the constant pressure of the liquid at the valve to ensure that the quantity dispensed is proportional to the time the valve is open. The valve may be relatively inexpensive, such as a solenoid valve, the valve only being required to switch between fully open and fully closed positions.

Such a system avoids the need to use either a positive displacement pump or positive displacement meter to accurately determine the quantity of liquid dispensed. In addition to avoiding the expense of such a pump (such as peristaltic pumps) or meter, particularly if these are to be suitable for use with a self-gassing liquid such as peracetic acid, the invention also avoids the use of such a pump or meter subjecting the liquid to high shear forces on passing through such a pump or meter. Any such shear forces may be problematic, for they may result in a very greatly increased quantity of gas being given off by the liquid, which may then cause inaccurate volumes to be dispensed or, in the case of an active liquid such as peracetic acid for example, this could shorten the effective life of the liquid, once dispensed.

The valve chamber and/or passage is defined by an internal upper surface, an internal lower surface and one or more internal side surfaces, wherein the outlet is located in one of the internal lower surface or one of the one or more internal side surfaces at a position remote from the upper surface, the valve chamber and/or passage being arranged so as to provide an uninterrupted upwardly extending path from an uppermost edge of the outlet to the inlet. Such an arrangement may permit gas given off by the liquid in the chamber, between dispensing operations, to be released from the chamber under the action of gravity acting on the liquid, thus avoiding the gas being dispensed, which may result in inaccurate volumes of liquid being dispensed.

The outlet is preferably raised from the internal lower surface, or the internal side surface, of the valve chamber and/or passage in which it is located for, in this manner, liquid may be arranged to be drawn through the outlet from a central region of the chamber, which central region will tend to be free from bubbles of gas which may tend to form at nucleation sites on the surfaces defining the chamber. More preferably the internal upper surface and the internal lower surface are at least 1 mm apart. This may be sufficient to permit laminar flow to occur within the chamber and/or passage, so that gas free liquid may be drawn through the chamber and into the outlet, without drawing into the outlet any bubbles of gas which may form on the surfaces of the chamber.

In one embodiment the pressure maintaining means comprises a tube extending upwardly from the inlet to the valve housing, with the level maintaining means arranged to maintain the level of liquid in the tube at a predetermined level or range of levels, such that the pressure of the liquid at the inlet to the valve housing remains substantially constant. The upper portion of the tube may widen out to form a small reservoir, which may make it easier to maintain the level at a predetermined level or within a predetermined range. The tube may be a separate component to the valve housing, or it could be integrally formed with the valve housing.

The provision of a tube enables a pressure to be maintained at a constant value, or within a specified range, at the inlet to the valve chamber, merely by maintaining the level of liquid within the tube. This avoids the need to pump the liquid to pressurise it, which would impose shear forces on the liquid, again generating gas bubbles and, at least in the case of peracetic acid, shortening the active life of the liquid once dispensed. Furthermore the dimensions of the tube may be selected such that gas bubbles forming on the sides of the tube, or being released from the inlet to the valve housing, may pass up the tube. The dimensions of the tube are more preferably selected such that the liquid experiences laminar flow within the tube and thus does not tend to draw any gas bubbles forming on the side of the tube down into the valve housing.

Preferably the diameter of the tube is greater than 6 mm and preferably is less than 15 mm. The liquid may arranged to be maintained at a level in the range of 150 mm to 350 mm above the level of the outlet of the valve housing, with the tube having an appropriate length to permit this.

Although the pressure maintaining system has been described above (and is described subsequently) with reference to a tube to provide a head of pressure, it could be provided by some other means, such as a constant pressure pump, although this could generate unacceptable shear forces the liquid, which may again result in the same consequential problems as have been mentioned above.

The system may further comprise a container for storing the liquid, wherein the level maintaining means comprises a pump arranged to pump the liquid from the container to the tube. The pump could be operated by a float switch, or other type of level detector on the tube. Any gas bubbles generated by the action of pumping would then separate from the liquid once in the tube, however, this may still shorten the active life of some chemicals. Also the pump would need to be suitable for use with the liquid, which may be a problem with some liquids, such as peracetic acid, which is non compatible with most common types of plastic and thus would require a specialised pump.

As an alternative to pumping the liquid, the dispensing system may further comprise a container for storing the liquid, wherein the level maintaining means further comprises a compressor arranged to pressurise the container, the container comprising a dip tube extending to the bottom of the container and being arranged to cause liquid in the container to be conveyed up the dip tube and to said tube of the dispenser, under the action of the pressure within the container.

The above arrangement enables the liquid to be dispensed from the container into the tube via the action of the pressure within the container generated by the compressor. This thus avoids the need to pump the liquid and the need for a pump to do this.

The term compressor, as used in the context of the present specification, comprises any means of compressing gas in a headspace in the container above the liquid. This may be a mechanical compressor, but it could equally be a source of compressed gas. However a mechanical compressor may be preferred, as it may be more controllable, its performance tending to be uniform for any given period of activation.

A non-return valve may be provided between the compressor and the container in order to prevent vapours seeping back to the compressor which, depending on the compressor type, may cause damage to the compressor, or this may permit vapours to escape to the atmosphere.

In any of the above mentioned arrangements, for maintaining the level of the liquid in the tube, it may be preferable that there is provision for liquid to flow back from the tube to the container, such that the tube may be slightly over filled, with the level then maintained in the tube via the flow back of liquid to the container.

The container may have a neck portion and further comprise an insert in the neck portion, which insert has a base portion and a sidewall portion, so as to define a void at the top of the neck portion, the base portion of the insert having the dip tube extending downwardly therefrom, the dip tube extending through the insert so as to form a passage through the insert into the void, or the dip tube being sealed with a passage extending through the insert into the void, the insert having a separate passage through the base portion connecting the void with a main body of the container below the neck portion.

This arrangement may be particularly advantageous where the container is used to transport the liquid to the other components of the dispensing system, avoiding the need to decant a transported liquid from a transport container to the container of the dispensing system, thus avoiding any hazards that may be associated with this.

The provision of the insert, in providing a void, may permit a cap to be placed on the container when transporting the liquid, which cap seals the container, with the possible exception of a small vent in the cap, to avoid gas build up during transportation. A gas permeable, liquid impermeable, membrane may extend below the cap and seal across the top of the void, preventing any liquid entering the void from reaching the vent. The void thus avoids the need to separately seal the dip tube during transportation of the container. Furthermore, the provision of the dip tube in the container avoids the need to withdraw a dip tube from a previous container and issues arising from this, such as where to store the contaminated and possibly dripping dip tube, prior to insertion into a fresh container.

With a container as described above, the dispensing system may preferably further comprise a connector arranged to seal with the neck of the container (once any cap has been removed) and provide at least an inlet into the container and an outlet out of the container, wherein the outlet is arranged to seal with the passageway through the insert. This may provide a quick and safe way of connecting to a replacement container, particularly where the dispensing system is housed within a housing which is arranged to receive replacement containers. Here a connection could then be arranged to be made with a fresh container simply my raising the container relative to the connector, to bring the connector into sealing engagement with the container. The inlet into the container may then be used to, on demand, pressurise the container to cause liquid to flow up the dip tube out of the container and replenish the liquid in the tube of the dispensing system The connector may have a vent with a restriction in it, to permit the slow escape of gas from the container in order to prevent any build-up of pressure over time. The restriction may be sufficiently small so as not to interfere with the deliberate pressurisation of the container. Alternatively, means may be provided as to temporarily close the vent, when the container is to be deliberately pressurised by a compressor in the manner previously described.

A filter may be provided which is sealed with the top of the tube to cause any gas escaping from the tube to be filtered by the filter before being released to the atmosphere. Any gas escaping from the container via the vent may also be passed through the same filter before being released to atmosphere.

The outlet for the liquid to be dispensed is preferably downward facing. If then appropriately shaped and dimensioned this may permit liquid to be dispensed directly into a receptacle, such as a trigger bottle, placed below the outlet without leaving any significant residual liquid in contact with the atmosphere at the outlet. This may be particularly achievable if the diameter of the outlet is less than 1 mm.

The invention is particularly suited to the dispensing of small accurate volumes of the liquid and preferably the dispensing system is arranged to dispense 1 ml of liquid to an accuracy of within 0.05 ml. The invention may be particularly suited to the dispensing of small and accurate quantities of peracetic acid.

Figure 2:
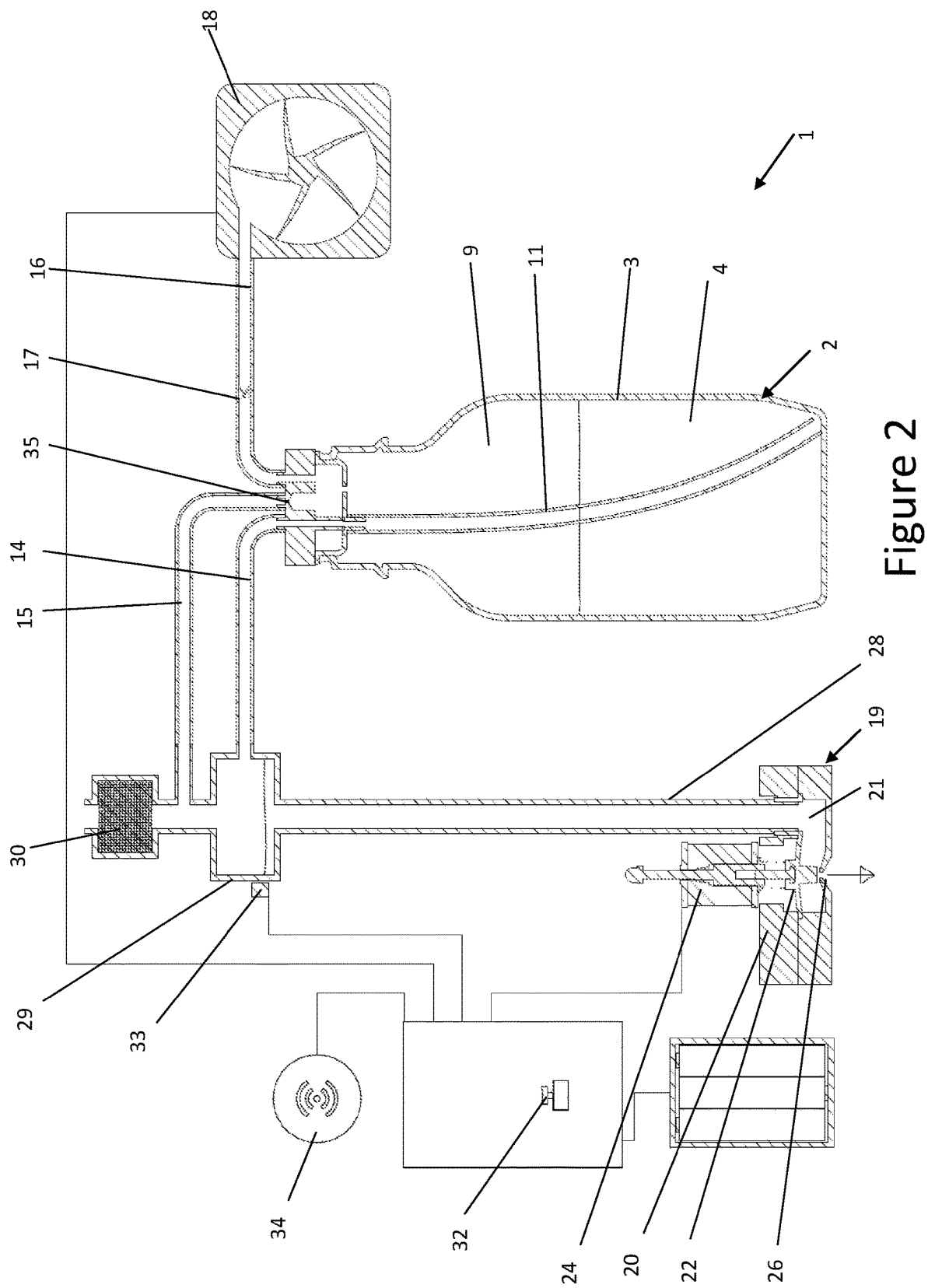
Figure 3:
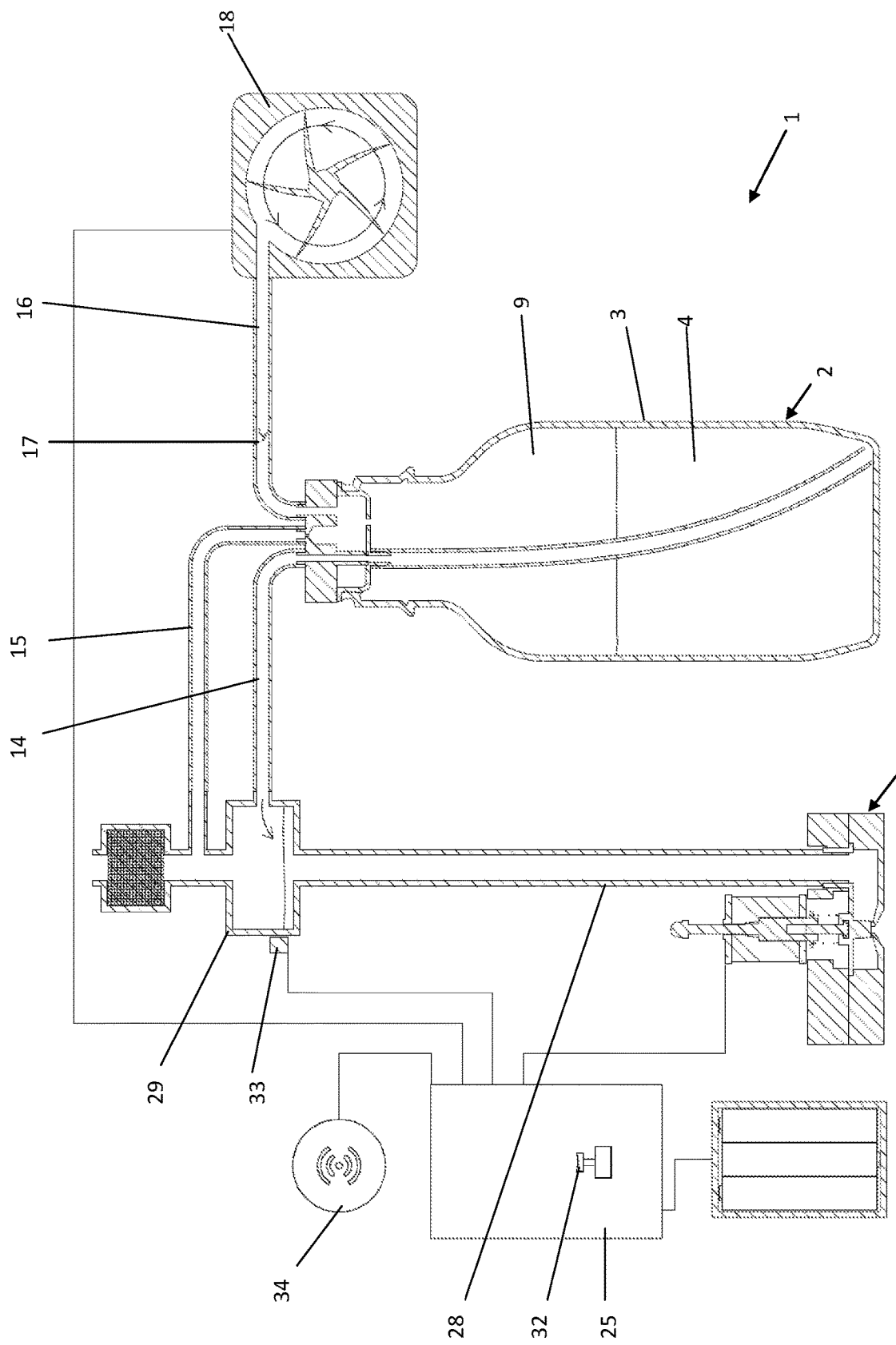
Figure 4:
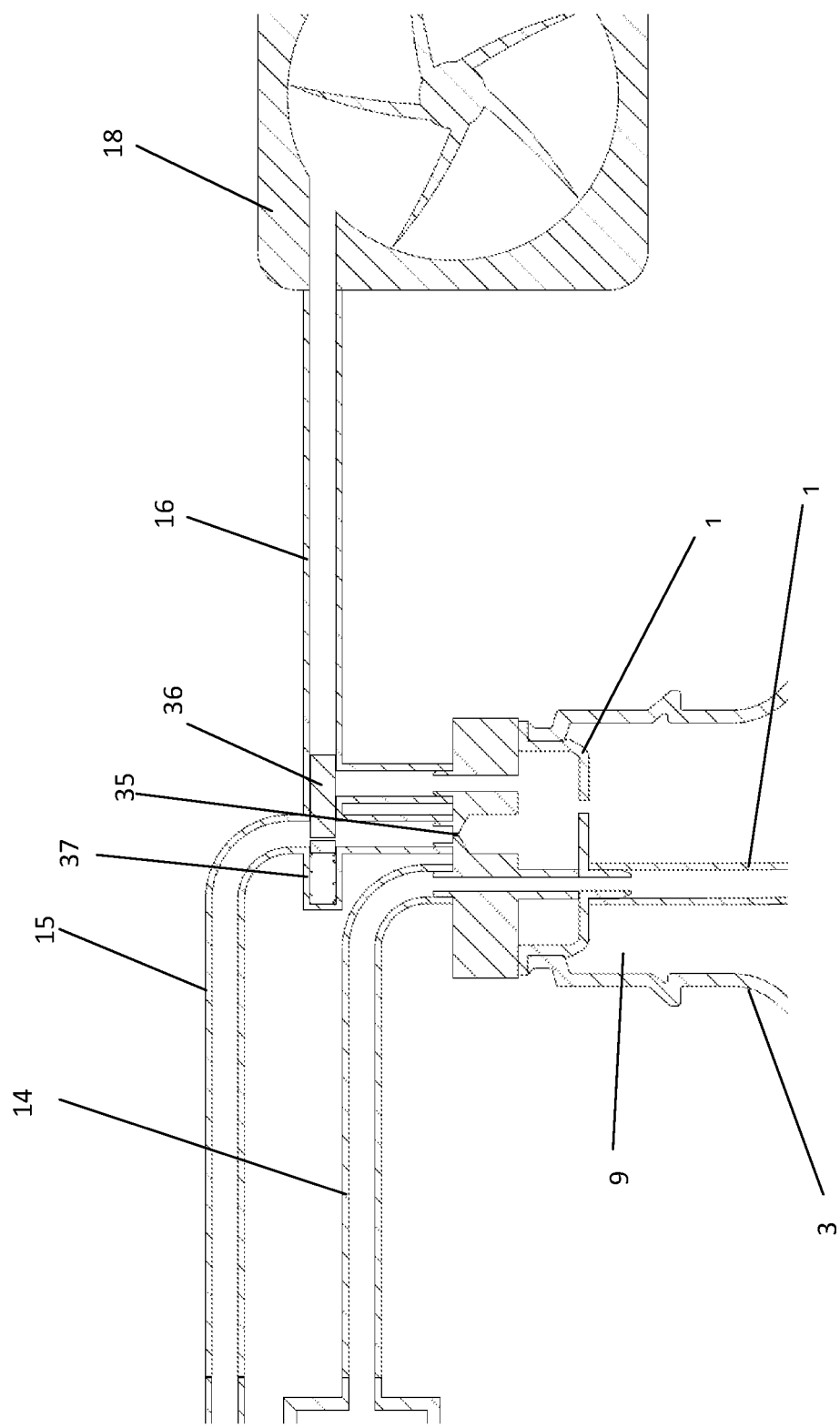
Figure 5:
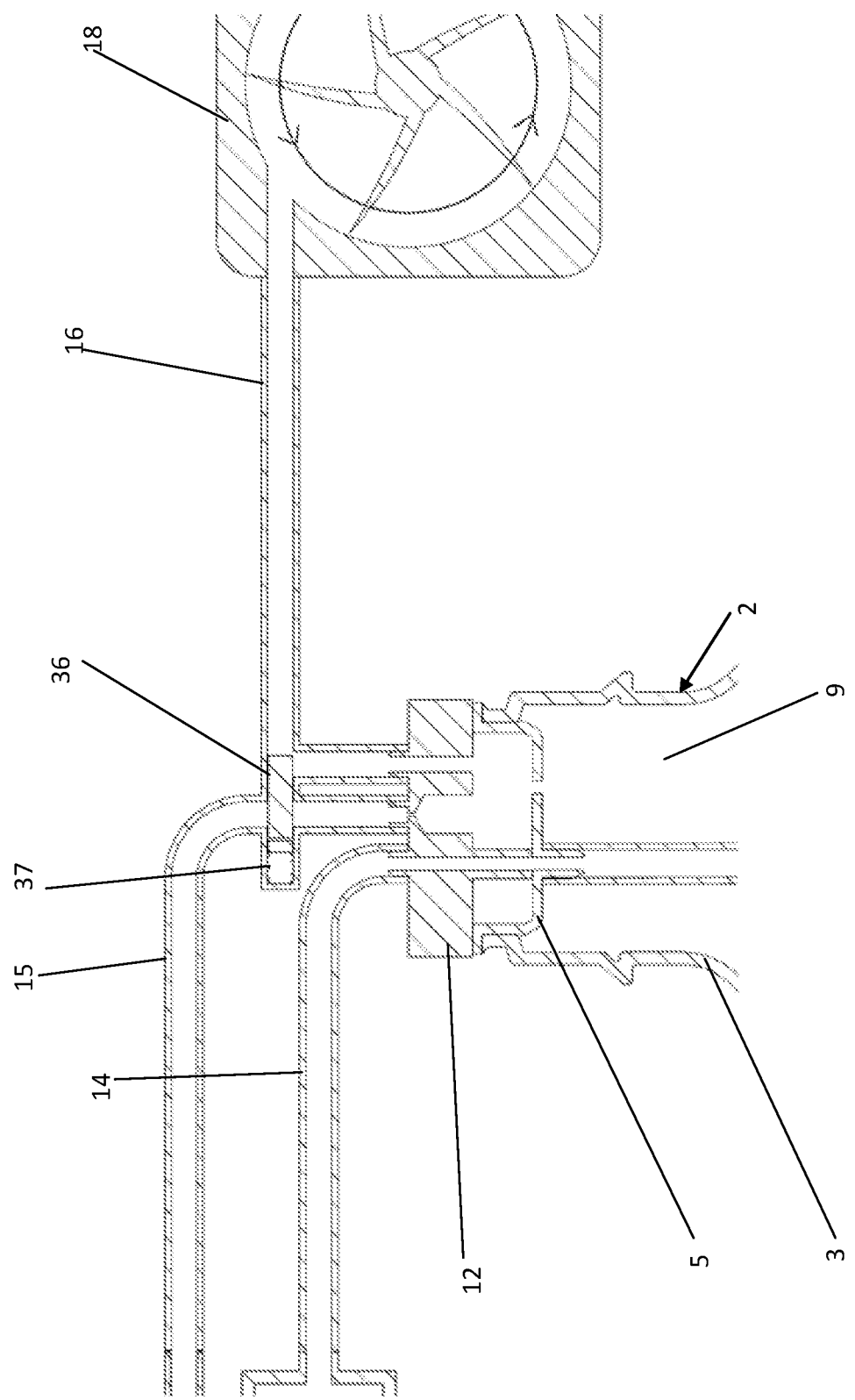
Figure 6:
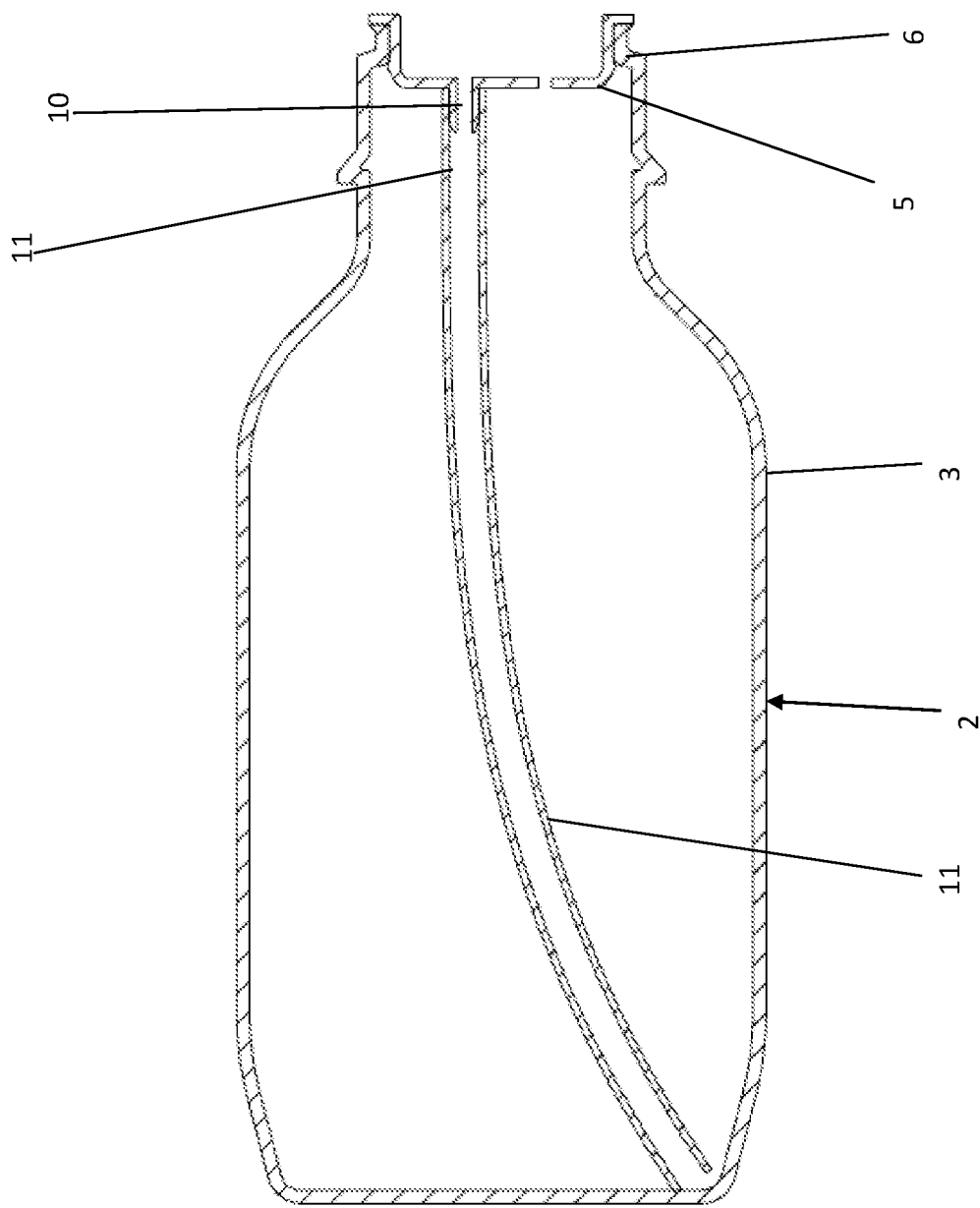
Figure 7:
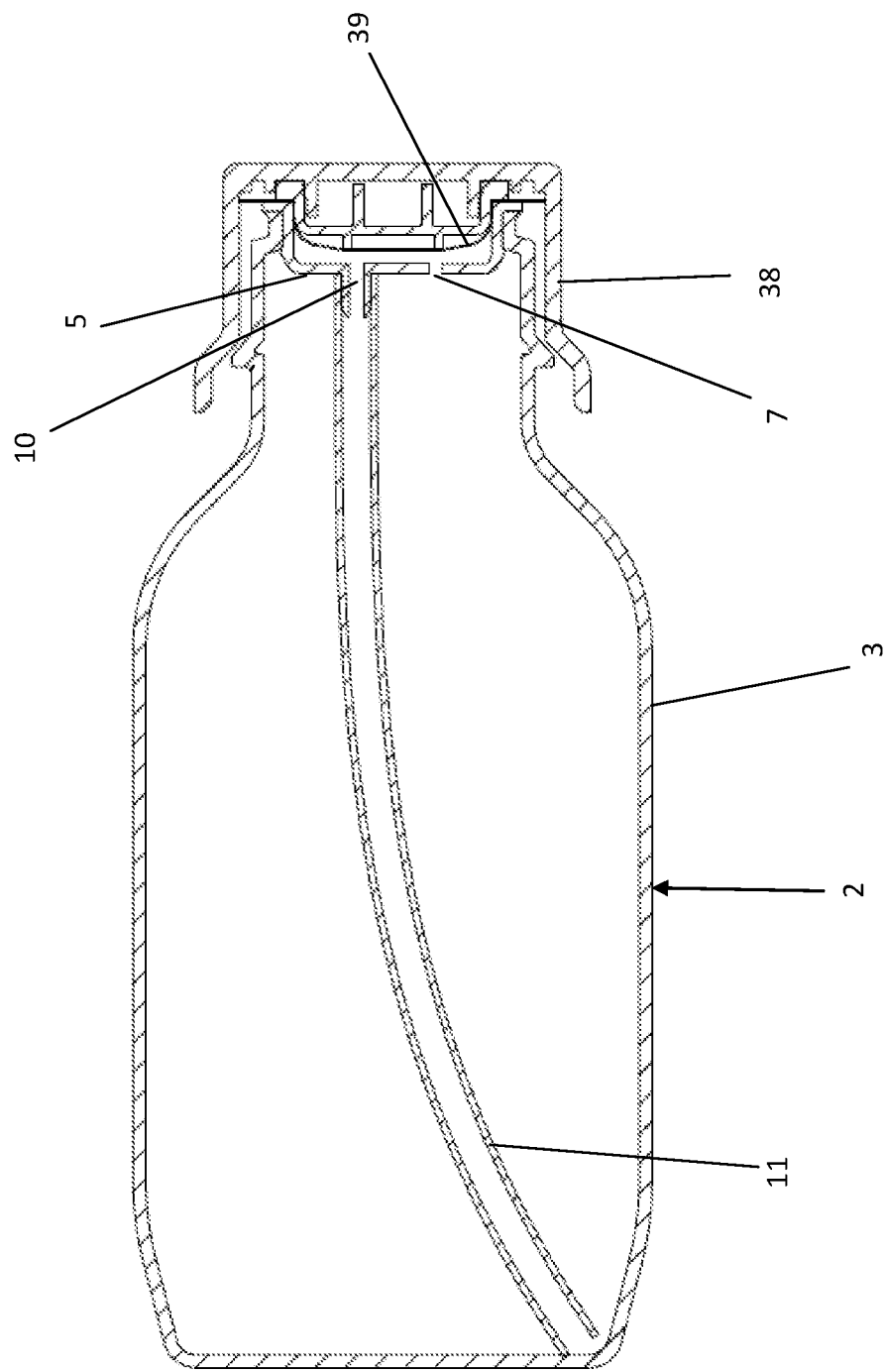

One embodiment of the present invention will now be described with reference to the accompanying drawings, of which:

FIG. 1 is a schematic diagram of a dispensing system in accordance with the present invention, at a first stage in the dispensing process;

FIG. 2 correspond to FIG. 1, but shows the dispensing system at a second stage in the dispensing process;

FIG. 3 correspond to FIGS. 1 and 2, but shows the dispensing system at a third stage in the dispensing process;

FIG. 4 shows an alternative arrangement of vent valve for use with the dispensing system of FIGS. 1 to 3, with the vent valve shown in an open position;

FIG. 5 corresponds to FIG. 4 but shows the vent valve in a closed position;

FIG. 6 shows a container of the dispensing system of FIGS. 1 to 3, when removed from the dispensing system;

FIG. 7 corresponds to FIG. 6 but shows a cap on the container.

Referring to FIG. 1, a dispensing system in accordance with the present invention, indicated generally as 1, comprises a container, indicated generally as 2, having a main body 3 for storing a liquid 4, which here is peracetic acid.

The container 1 comprises an insert 5, in a neck portion 6 of the main body 3 of the container 2, which insert 5, as can be seen from FIG. 1, is U-shaped in cross-section defining a void 7. The insert 5 has a hole 8 extending through a base portion of the insert 5, the hole 8 connecting the void 7 to a head space 9 above the liquid 4 in the main body 3 of the container 2. The insert 5 also defines a passageway 10, passing through the lower portion of the insert 5, which passageway 10 is connected to a dip tube 11 extending to the bottom of the main body 3 of the container 2. Across the top of the container 2 is placed a connector plate 12, with a downward projection 13 of the connector plate 12 being arranged such that, when the connector plate 12 is lowered vertically onto the container 2, as shown in FIG. 1, extension portion 13 seals with the passage 10 at the same time as the connector plate seals with a top surface of the insert 5. Thus, lowering the connector plate 12 onto the container 2, or raising the container 2 into contact with the connector plate 12, connects the dip tube 11 to a transfer tube 14 and connects the void 7 to both a vent tube 15 and pressurising tube 16. The pressurising tube 16 connects the container 2 to a compressor 18, via non-return valve 17. In the embodiments illustrated the compressor 8 is shown is a simple air fan, but this could be any device arranged to increase the pressure in the headspace 9 of the container 2, for example it could be a source of compressed air.

The dispensing system 1 further comprises a main dispensing unit, indicated generally as 19, which comprises a valve housing 20. The valve housing 20 defines a chamber 21 in which a diaphragm valve 22 is housed, which diaphragm valve 22 is urged to the closed position, shown in FIG. 1, by the action of a spring 23. The diaphragm valve 22 is opened by a control circuit 25 activating a solenoid 24. The diaphragm valve 22 is arranged to open and close an outlet 26 of the valve chamber 21 of the valve housing 20, which outlet 26 defines the final outlet of the dispensing system 1. The outlet 26 has an uppermost edge 41. The valve housing 20 also defines an inlet 27 of the valve chamber 21. The inlet 27 is connected to a tube 28 which has a reservoir portion 29 located towards an upper end and which terminates in a filter 30. The filter 30 is arranged to filter and reduce odors from any gas released from the top of the tube 28. The reservoir portion 29 is connected to the transfer tube 14, as shown, and a section of the tube 28 above the reservoir portion 29 is connected to the vent tube 15, as shown.

The previously mentioned control circuit 25 receives power from a power source, in this instance a battery pack 31. The control circuit 25 has a push button switch 32 to indicate that liquid 4 is to be dispensed.

In addition to being connected to the solenoid 24, the control circuit 25 is also connected to the compressor 18 and a level sensor 33 arranged to detect the level of liquid 4 in the reservoir portion 29 of the tube 28. The control circuit 25 is also further connected to a reader 34, which is preferably a radio frequency identification device (RFID) reader, but this could be a barcode reader or similar. The reader 34 may be arranged to read a code from the container 2 or on a receptacle (not shown), such as a trigger bottle, for receiving liquid from the outlet 26 of the dispensing system 1.

All the components of the dispensing system 1 shown in FIG. 1 may be housed in a single casing, with, in this instance, the battery pack 31 providing power for the dispensing system 1. For clarity, the casing is not shown, but it would typically have a door that may be opened to replace a spent empty container 2 with a fresh full container. The casing may also have a lever arrangement for raising and lowering the connector plate 12, in order to release the spent container 2 and connect and seal to a new container 2. The whole dispensing system 1 may then be easily portable.

In use, an operator passes a new container 2 by the reader 34, to enable the control circuit 25 to identify the container and from this the type of liquid 4 and the concentration of the liquid 4 within the container 2. The liquid 4 in this embodiment is self-gassing peracetic acid.

The container 2 is then inserted into the casing (not shown) and the connection plate lowered to seal with the container 2, as shown in FIG. 1. The push button switch 32 is then pressed, which causes compressor 18 to be activated, pressurising the headspace 9 in the main body 3 of the container 2, causing liquid 4 to pass up the dip tube 11 and along the transfer tube 14, to the reservoir portion 29 of the tube 28. This liquid 4 then runs down the tube 28 and causes the valve chamber 21 of the valve housing 20 to fill with liquid 4 and then the tube 28 to fill, until a level is reached where level sensor 33 detects the presence of liquid, causing the control circuit 25 to terminate operation of the compressor 18. At this point the pressure in the headspace 9 will cause additional liquid to enter the reservoir portion 29. However, as the pressure in the headspace 9 decays this additional liquid drains back to the container 2, via the transfer tube 14, until the liquid 4 reaches the correct level in the reservoir portion 29, as indicated in FIG. 1.

Although the non-return valve 17 in the pressurising tube 16 prevents corrosive vapours venting via the compressor 18, (enabling the compressor 18 to be any suitable type of pump or fan and not one specifically capable of withstanding damage from peracetic acid or vapours from peracetic acid), the pressure in the headspace 9 may still decay back to atmospheric pressure via vent tube 15, with the vapours passing along the vent tube 15 having to pass through the filter 30 before escaping to the atmosphere.

In the embodiment of FIGS. 1 to 3 a restriction 35, formed in the connector plate 12, restricts the flow of vapours from the headspace 9 to the vent tube 15. This permits the gradual decay of any pressure in the headspace 9, whilst also permitting the headspace 9 to be pressurised while the compressor 18 is in operation, by restricting the flow through the vent tube 15. The restrictor 35 and vent tube 15 also permits any gas released from the liquid 4 in the container 2 to be vented, which gas may otherwise cause liquid to unintentionally be forced up the dip tube 11 and along the transfer pipe 14, causing the reservoir portion 29 of tube 28 to be overfilled. The provision of the vent tube 15 also ensures that, as the container 2 is subject to temperature fluctuations, the pressure in the head space 9 remains at atmospheric pressure, with the possibility of air being drawn in through the filter 30.

In this instance, the connection between the transfer tube 14 and reservoir portion 29 of tube 28 is arranged to be 300 mm above the outlet 26, creating a pressure of 0.3 bar at the outlet 26. It may also be beneficial for the pressure at the outlet 26 to be maintained above the vapour pressure of the liquid being dispensed. In this instance, the outlet 26 has a rim diameter of 0.8 mm and the rim is raised up above the level of a floor of the valve chamber 21. The outlet 26 is also spaced from both the roof and side walls of the valve chamber 21.

The dimensions of the valve chamber 21 and of the tube 28 are selected such that for a liquid of a known viscosity and density, a head of pressure created by the level of the liquid above the outlet 26 and the selected diameter of the rim of the outlet 26, the flow through both the tube 28 and the valve chamber 21 is a laminar flow. For a dispensing system as illustrated in FIG. 1, when dispensing peracetic acid, the diameter of the tube 28 and spacing between the floor and roof of the valve chamber 21 will typically be of the order of 10 mm, in order to ensure that laminar flow occurs.

When the valve chamber 21 initially fills with liquid 4, air or gas in the valve chamber 21 is displaced and this passes up the tube 28, to be vented through filter 30. Gas then subsequently given off by the liquid 4 in the chamber 21 will materialise as gas bubbles on the surfaces of the chamber 21, as the surface creates nucleation sites for the gas bubbles. As the gas bubbles continue to form and grow, the dimensions of the valve chamber 21 permit these to float out of the chamber 21 and to pass up the tube 28, before the gas bubbles can extend across the valve chamber 21. Similarly, the side of the tube 28 also forms nucleation sites for gas bubbles, but the diameter of the tube is sufficient to ensure that gas bubbles collecting on the walls of the tube do not extend across the tube before they float up the tube 28. Thus a clear passage is maintained both through the tube 28 and the valve chamber 21 to the outlet 26. It is for this reason that the outlet 26 is raised, as shown in FIG. 1, such that when the diaphragm valve 22 is opened, liquid 4 may pass through both the valve chamber 21 and tube 28, without drawing in to the outlet 26 any gas bubbles accumulating on the surfaces of the valve chamber 21 or tube 28, which may make it difficult to accurately determine the quantity of liquid dispensed.

FIG. 1 shows the dispensing system 1 in a state where it is ready to dispense liquid 4 through the outlet 26. At this stage a user may present a receptacle (not shown), such as a 750 ml trigger bottle, with an appropriate identifier on it, to the reader 34. This will identify to the control circuit 25 the volume of that receptacle and enable the control circuit 25 to determine the volume of liquid 4 to be dispensed. The operator may then place the receptacle under the outlet 26 and push the pushbutton switch 32. This causes the control circuit 25 to energise the solenoid 24, which in turn, almost instantaneously, causes the diaphragm valve 22 to go from the fully closed position of FIG. 1, to the fully open position shown in FIG. 2. For a 750 ml trigger spray bottle a quantity of 2 ml will typically be required, requiring the valve to be opened for 1.5 seconds. The dispensing system illustrated permits 2 ml to be dispensed within an accuracy of 0.05 ml and indeed permits volumes as small as 0.5 ml to be dispensed with the same accuracy, with the quantity dispensed being directly proportional to the time the valve 22 is open. Furthermore, the dispensing system of the invention avoids the need to pump or meter the liquid 4, which in the case of peracetic acid would cause excess gas generation due to the shear forces that would be experienced by the liquid as it passed through a pump meter, which gas may then result in inaccurate volumes of liquid being dispensed. In addition, the shear forces exerted by any such pump, or meter, would likely also significantly reduce the subsequent active life of the peracetic acid dispensed to the receptacle.

With continued reference to FIG. 2, as the level of liquid 4 in the reservoir portion 29 falls, as indicated in FIG. 2, this is detected by the level sensor 33 which causes the compressor 18 to be activated, which in turn results in the reservoir portion 29 being replenished, as shown in FIG. 3. When the level sensor 33 detects that the reservoir portion is again full the compressor 18 is then turned off, allowing the pressure in the headspace 9 to decay and any excess liquid 4 in the reservoir portion 29 to drain back to the container 2 via the transfer tube 14.

With a gravity based dispensing system of this type, the precise level of the liquid in the reservoir portion is not critical, as this can be a very small percentage of the total height above the outlet 26. This, in combination with the quantities dispensed possibly being relatively small, means that the level sensor 33 and/or control circuit 25 may be arranged such that the compressor 18 will not be energised for every dispensing action. This may be significant when the dispensing system is a battery powered system, as it may reduce the frequency with which the battery has to be charged and hence the period between servicing of the dispensing system 1. As an alternative though, the compressor 18 could be activated every time the pushbutton switch 32 is activated, with the compressor then running for a predetermined period of time, sufficient to ensure the reservoir portion 29 is always overfilled. The level in the reservoir portion 29 would then drain back through transfer tube 14 in order to settle at the correct level. Such an arrangement may avoid the need for level sensor 33, but would result in a heavier drain being placed on the battery of the battery pack 31.

Referring now to FIG. 4, here there is shown an embodiment where the non-return valve 17 in the pressurising tube of FIGS. 1 to 3 is omitted. In FIG. 4 the compressor 18 is instead connected to the connector plate 12 via a vent valve 36. The vent valve 36 will normally be urged to the open position shown in FIG. 4, under the action of spring 37, permitting venting of the headspace 9 via the vent tube 15, as shown in FIG. 4. However, on activation of the compressor 18, pressure generated by the compressor 18, in the pressurising tube 16, will cause the vent valve 36 to move to the left, as indicated in FIG. 5, closing the vent tube 15 during operation of the compressor 18. Then, as soon as the compressor 18 is stopped, the vent valve 36 will again return to the open position shown in FIG. 4, permitting the pressure in the headspace 9 to again vent via the vent tube 15.

With the arrangement of FIGS. 4 and 5, the vent valve 36 avoids unnecessary air being brought into the system and passing through the filter 30 of FIGS. 1 to 3 during those periods when the compressor 18 is running, reducing the energy required to sufficiently pressurise the headspace 9.

Referring now to FIG. 6, this shows an empty container 2 once this has been removed from the dispensing system of FIG. 1. Alternatively, if the container 2 is considered to be a fresh container and full of liquid, FIG. 6 then shows how the container 2 is ready to be simply placed into the dispensing system of FIGS. 1 to 3, with the connector plate 12 of those figures then lowered into contact with the top of the container 2, to connect the container in the manner described above with particular reference to FIG. 1.

FIG. 7 shows the container 2 of FIG. 6 in a transport configuration, with a cap 38 placed on the container 2. The cap 38 comprises a membrane 39 permeable to gas but not to liquid. When the cap 38 is placed on the container 2 it seals across the top of the insert 5, whilst still leaving a portion of the void 7 intact. Gas passing through the membrane 39 in the central portion from the void 7 may then pass again through the membrane 39 at the edges of the cap 38, indicated by arrow 40, in order to vent down the sides of the cap 38. An advantage of this arrangement is that the dip tube 11 and passageway 10 through the insert 5 are in fluid communication with the hole 8 through the insert 5, avoiding the possibility of any pressure differential existing between the bottom and the top of the dip tube 11, which could otherwise cause liquid to be ejected through the passageway 10 when the cap 38 is removed from the container 2.

The present invention has been described above by way of example only and it will be appreciated that many variations and modifications may be made without departing from the scope of the invention as defined by the following claims. In particular it may be possible to constantly pressurise the liquid to be dispensed other than by a gravity based system. For example an air pump or similar could maintain a constant pressure in a container or other reservoir which is then directly connected to a valve housing, which could be the same or similar to the valve housing 20 disclosed in the present figures.

The invention claimed is:

1. A dispensing system comprising:
a self-gassing liquid to be dispensed; and
a dispenser for dispensing said self-gassing liquid;
wherein the dispenser comprises:
a valve housing comprising an inlet for receiving the self-gassing liquid, an outlet through which the self-gassing liquid is to be dispensed, a valve chamber and/or passage extending between the inlet and the outlet, and a valve arranged to open and close the valve chamber and/or passage;
pressure maintaining means arranged to maintain the self-gassing liquid at the inlet of the valve housing at a constant pressure during successive dispensing operations; and
control means for controlling the opening and closing of the valve, the control means being arranged to open and close the valve to commence and terminate each successive dispensing operation, wherein the control means is arranged to open the valve for a predetermined period of time that is determined by a desired quantity of self-gassing liquid to be dispensed;
wherein the valve chamber and/or passage is defined by an internal upper surface, an internal lower surface, and one or more internal side surfaces; and
wherein the outlet is located in the internal lower surface or in one of the one or more internal side surfaces at a position remote from the upper surface, the valve chamber and/or passage being arranged so as to provide an uninterrupted upwardly extending path from an uppermost edge of the outlet to the inlet.

2. The dispensing system as claimed in claim 1, wherein the valve comprises a seal portion arranged to seal with a valve seat on the outlet, which seal portion extends from a diaphragm forming the internal upper surface of the valve chamber and/or passage.

3. The dispensing system as claimed in claim 1, wherein the outlet is raised from the internal lower surface or the internal side surface of the valve chamber and/or passage in which the outlet is located.

4. The dispensing system as claimed in claim 1, wherein the internal upper surface and the internal lower surface are at least 1 mm apart.

5. The dispensing system as claimed in claim 1, wherein the pressure maintaining means comprises: a tube extending upwardly from the inlet of the valve housing, and level maintaining means arranged to maintain a level of self-gassing liquid in the tube at a predetermined level or range of levels such that the pressure of the self-gassing liquid at the inlet remains substantially constant.

6. The dispensing system as claimed in claim 5, wherein an upper portion of the tube is in the form of a small reservoir.

7. The dispensing system as claimed in claim 5, wherein a diameter of the tube is greater than 6 mm.

8. The dispensing system as claimed in claim 5, wherein a diameter of the tube is less than 15 mm.

9. The dispensing system as claimed in claim 5, being configured to maintain the level of self-gassing liquid in the tube at a level in the range of 150 mm to 350 mm above a level of the outlet.

10. The dispensing system as claimed in claim 5, further comprising a container for storing the self-gassing liquid, wherein the level maintaining means comprises a pump arranged to pump the self-gassing liquid from the container to the tube.

11. The dispensing system as claimed in claim 5, further comprising a container for storing the self-gassing liquid, wherein the level maintaining means further comprises a compressor arranged to pressurise the container, the container comprising a dip tube extending to the bottom of the container and being arranged to cause self-gassing liquid in the container to be conveyed up the dip tube and to said tube of the dispenser under the action of pressure within the container.

12. The dispensing system as claimed in claim 11, further comprising a non-return valve in a line between the compressor and the container.

13. The dispensing system as claimed in claim 10, further comprising means to permit the self-gassing liquid to flow from the tube back to the container, such that the tube may be slightly over-filled, with the level then maintained in the tube via the flow of self-gassing liquid back to the container.

14. The dispensing system as claimed in claim 11, wherein the container has a neck portion and comprises an insert in the neck portion, the insert having a base portion and a sidewall portion so as to define a void at a top of the neck portion, the base portion of the insert having the dip tube extending downwardly therefrom, the dip tube extending through the insert so as to form a passage through the insert into the void, or the dip tube being sealed with a passage extending through the insert into the void, the insert having a separate passage through the base portion connecting the void with a main body of the container below the neck portion.

15. The dispensing system as claimed in claim 14, further comprising a connector arranged to seal with the neck portion of the container and provide at least an inlet into the container and an outlet out of the container.

16. The dispensing system as claimed in claim 14, further comprising a connector arranged to seal with the neck portion of the container and provide at least an inlet into the container and an outlet out of the container, wherein the dip tube is sealed with a passage extending through the insert into the void, and wherein the outlet out of the container is arranged to seal with the passage extending through the insert.

17. The dispensing system as claimed in claim 15, wherein the connector comprises a vent with a restriction in the vent to permit a slow escape of gas from the container in order to prevent any build-up of pressure in the container over time.

18. The dispensing system as claimed in claim 17, further comprising means for temporarily closing the vent in the event that the container is deliberately pressurised.

19. The dispensing system as claimed in claim 5, further comprising a filter sealed with a top of the tube to cause any gas escaping from the tube to be filtered by the filter before being released to an atmosphere external to the dispensing system.

20. The dispensing system as claimed in claim 17 further comprising a filter sealed with a top of the tube to cause any gas escaping from the tube to be filtered by the filter before being released to the atmosphere, wherein any gas escaping from the container via the vent is passed through the filter before being released to atmosphere.

21. The dispensing system as claimed in claim 1, wherein the valve is a solenoid valve that can be switched only between a fully open and a fully closed position.

22. The dispensing system as claimed in claim 1, wherein the outlet is downward facing.

23. The dispensing system as claimed in claim 1, wherein the diameter of the outlet is less than 1.0 mm.

24. The dispensing system as claimed in claim 1, being configured to dispense 0.5 ml of liquid with an accuracy of 0.05 ml.

25. The dispensing system as claimed in claim 1, wherein the self-gassing liquid is peracetic acid.

26. The dispensing system as claimed in claim 1, being arranged to dispense the self-gassing liquid directly from the outlet into a receptacle.

27. The dispensing system as claimed in claim 26, wherein the receptacle is a trigger spray bottle.

* * * * *